(12) United States Patent
Hogan et al.

(10) Patent No.: US 6,630,535 B1
(45) Date of Patent: Oct. 7, 2003

(54) RUBBER COMPOSITIONS & VULCANIZATES INCLUDING COMB POLYMERS

(75) Inventors: Terrence E. Hogan, Cuyahoga Falls, OH (US); James A. Krom, Cleveland, OH (US); James E. Hall, Mogadore, OH (US); Xiaorong Wang, Akron, OH (US); Peyman Pakdel, Akron, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 97 days.

(21) Appl. No.: 09/642,497

(22) Filed: Aug. 18, 2000

(51) Int. Cl.⁷ .............................................. C08L 51/00
(52) U.S. Cl. ............................ 525/86; 525/87; 525/80; 525/83; 525/84; 525/70; 525/331.9; 525/332.6; 152/209.1
(58) Field of Search ............................ 525/222, 331.9, 525/332.6, 80, 70, 88; 152/209.1

(56) References Cited

U.S. PATENT DOCUMENTS

| | | | |
|---|---|---|---|
| 5,221,716 A | 6/1993 | Jalics et al. ................. | 525/276 |
| 5,300,569 A | 4/1994 | Drake et al. ................. | 525/78 |
| 5,342,896 A | 8/1994 | Jalics et al. ................. | 525/193 |
| 5,494,981 A | 2/1996 | Gorodisher et al. ........ | 525/504 |
| 5,506,320 A | 4/1996 | Yu ............................... | 526/266 |
| 5,733,965 A | 3/1998 | Scholl et al. ................ | 524/513 |
| 5,756,580 A | 5/1998 | Natori et al. ................ | 525/100 |
| 5,905,116 A | 5/1999 | Wang et al. .................. | 525/74 |
| 5,994,468 A | 11/1999 | Wang et al. .................. | 525/178 |
| 6,054,532 A * | 4/2000 | Wang et al. .................. | 525/66 |
| 6,107,409 A * | 8/2000 | Hogan et al. ................ | 525/285 |
| 6,133,354 A | 10/2000 | Wang et al. .................. | 524/268 |
| 6,207,763 B1 * | 3/2001 | Wang et al. .............. | 525/327.4 |
| 6,248,827 B1 * | 6/2001 | Wang et al. .................. | 525/91 |
| 6,251,994 B1 * | 6/2001 | Wang et al. ................ | 525/127 |
| 6,268,427 B1 * | 7/2001 | Wang et al. ................ | 524/504 |
| 6,359,064 B1 * | 3/2002 | Wang et al. .................. | 525/66 |

FOREIGN PATENT DOCUMENTS

| | | |
|---|---|---|
| DE | 3526549 | 2/1987 |
| EP | 0 585 012 | 3/1994 |
| EP | 0 448 902 B1 | 5/1996 |
| EP | 0 879 831 | 11/1998 |
| EP | 0 924 225 A1 | 6/1999 |
| EP | 0 955 316 A1 | 11/1999 |
| EP | 0 955 317 A1 | 11/1999 |
| EP | 0 955 318 A1 | 11/1999 |
| EP | 0 955 319 A1 | 11/1999 |
| EP | 0 955 320 A1 | 11/1999 |
| EP | 0 955 329 A1 | 11/1999 |
| EP | 0 955 330 A1 | 11/1999 |
| EP | 0 964 006 A1 | 12/1999 |
| WO | WO 00/49085 | 8/2000 |

OTHER PUBLICATIONS

"Size Distribution for Aggregates of Associating Polymers. II. Linear Packing" by Wang and Safran, *J. Chem. Phys.* 89 (8), pp. 5323–5328, Oct. 1998.

"Surfactant–Induced Lyotropic Behavior of Flexible Polymer Solutions" by Fredrickson, *Macromolecules* 26, pp. 2825–2831, 1993.

"Functionalized Polymers and Macromonomers" by Hsieh and Quirk, *Anionic Polymerization: Principles and Practical Applications*, pp. 291–306, 1996.

"From comb Polymers to Polysoaps: a Monte Carlo Attempt" by Rouault, *Macromol. Theory Simul.* 7, pp. 359–365, 1998.

"Regular Comb Polystyrenes and Graft Polyisoprene/Polystyrene Copolymers with Double Branches ("Centipedes"). Quality of (1,3–Phenylene)bis(3–methyl–1–phenylpentylidene) dilithium Initiator in the Presence of Polar Additives" by Iatrou et al., *Macromolecules* 31, pp. 6697–6701, 1998.

"Reactive Extrusion in the Preparation of Carboxyl–Containing Polymers and Their Utilization as Compatibilizing Agents" by Gaylord, Reactive Extrusion Principles and Practice, Hanser Publishing, pp. 55–65, 1992.

* cited by examiner

*Primary Examiner*—David W. Wu
*Assistant Examiner*—Rip A Lee
(74) *Attorney, Agent, or Firm*—Meredith E. Palmer; Arthur M. Reginelli

(57) ABSTRACT

A composition comprising an elastomer, a filler, and a comb-like polymer, the comb-like polymer comprising a backbone and a plurality of side chains, the backbone having a length greater than or equal to the entanglement length, the side chains having a length greater than about 33% of the entanglement length, the backbone including at least one side chain per entanglement length, and the comb-like polymer having a $T_g$ of less than −5° C.

28 Claims, 11 Drawing Sheets

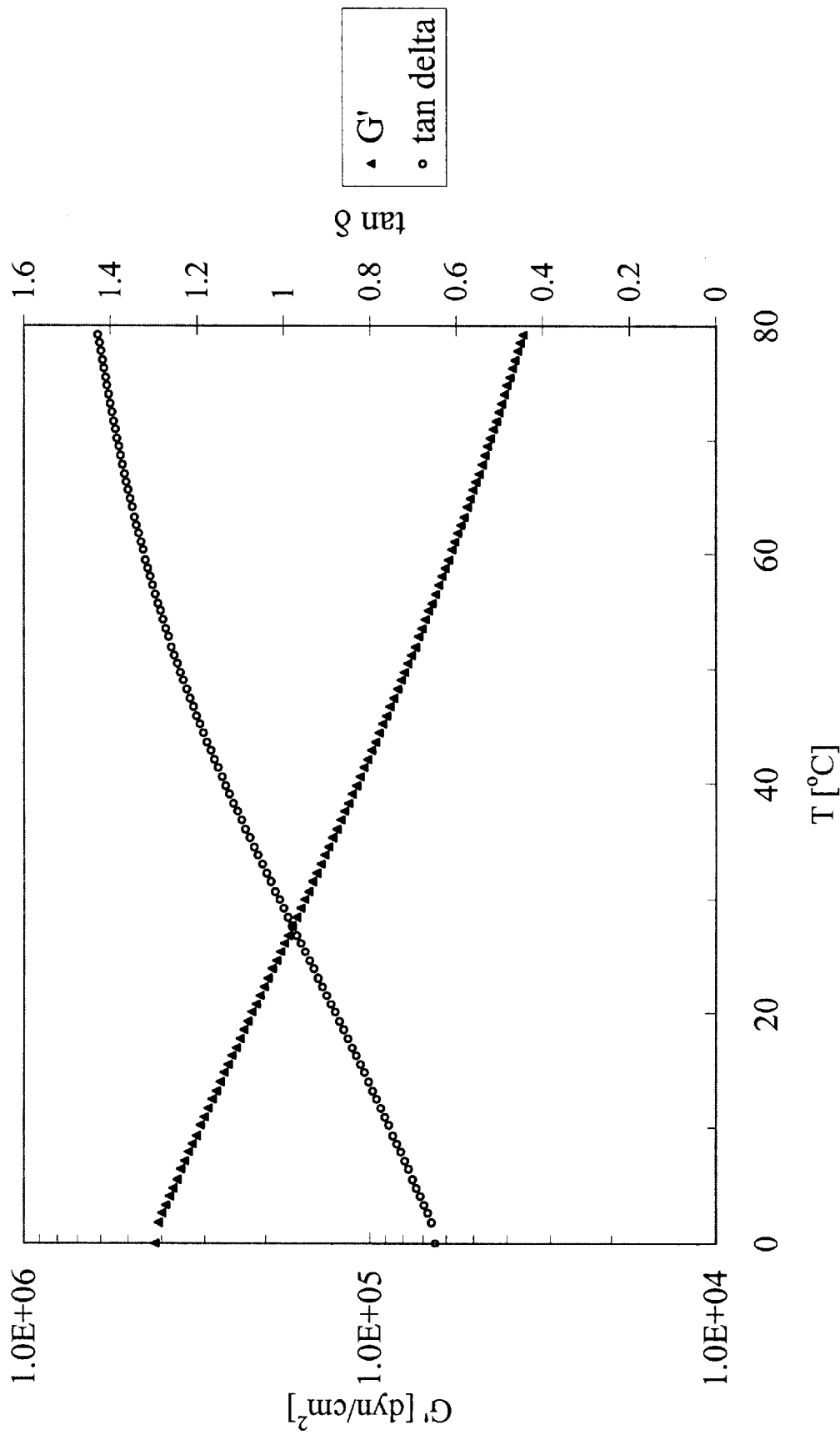
Fig. 11 Sample 25 (at 1Hz and 0.5% Strain)

US 6,630,535 B1

RUBBER COMPOSITIONS & VULCANIZATES INCLUDING COMB POLYMERS

TECHNICAL FIELD

The present invention is directed toward rubber compositions and vulcanizates that exhibit damping over a wide temperature and frequency range. More particularly, these compositions and vulcanizates include a damping component, which includes a comb polymer. In a preferred embodiment the vulcanizates are tire components.

BACKGROUND OF THE INVENTION

Damping is the absorption of energy, such as vibrational or sound energy, by a material in contact with the source of that energy. Damping vibrational energy from a number of sources such as motors and engines can be desirable.

Viscoelastic materials are often employed for damping applications. Energy is absorbed by the viscoelastic material and converted into heat. Ideally, viscoelastic materials employed for damping are effective over a wide range of temperatures and frequencies.

The viscoelastic nature of materials can be mathematically represented by the formula $G^*=G'+iG''$ where $G^*$ is the complex shear modulus, $G'$ is the elastic or storage modulus, $G''$ is the viscous or loss modulus, and $i=\sqrt{-1}$. The damping effectiveness of viscoelastic materials can be quantified by measuring viscoelastic response to a periodic stress or strain. Results of dynamic mechanical tests are generally given in terms of $G'$ and $G''$, where $G''$ is directly related to the amount of mechanical energy converted to heat, i.e., damping.

The ratio of $G''$ to $G'$ is often referred to as tan δ, $$\tan\delta = \frac{G''}{G'}$$

which quantifies a material's ability to dissipate mechanical energy versus the purely elastic storage of mechanical motion during one cycle of oscillatory movement. Tan δ can be measured by a dynamic analyzer, which can sweep many frequencies at a fixed temperature, then repeat that sweep at several other temperatures, followed by the development of a master curve of tan δ versus frequency by curve alignment. An alternate method measures tan δ at constant frequency over a temperature range.

In common practice, the tan δ of a material is usually broadened by taking advantage of the glass transition temperature of several materials within a temperature range. U.S. Pat. No. 5,494,981 teaches a composition that comprises resins that are cured in sequential fashion by using a single catalyst. The catalyst is a Bronsted acid that activates an epoxy resin component and then activates cyanate trimerization into polytriazines. The composition provides a glass transition damping peak around 100° C. and is understood to be heat stable over a temperature range of about 0° to at least 300° C.

Although numerous compositions are known for damping, there is a need for improved damping compositions that exhibit a high degree of damping over a wide range of temperatures and frequencies without involving glass transition peaks. Enhancing hysteresis (tan δ) by using superposition of glass transition peaks is not desirable because the modulus of the material drops dramatically at or about the glass transition temperature.

BRIEF DESCRIPTION OF THE DRAWINGS

FIG. 11 is a graphical plot of the dynamic moduli sweep of a comb polymer prepared by using macromonomer synthesis.

SUMMARY OF INVENTION

Figure 1A:
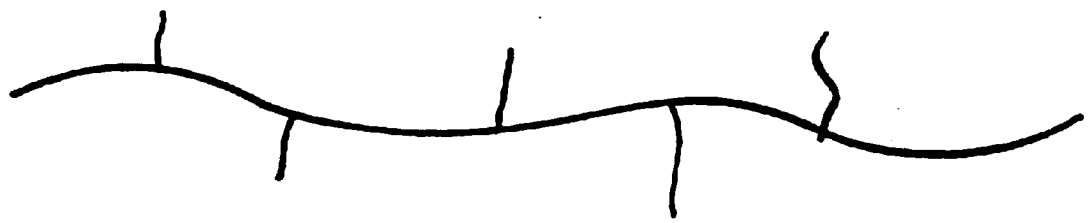
FIG. 1a is a representation, on a macromolecular scale, of one embodiment of a comb polymer.

In general the present invention provides a composition comprising an elastomer, a filler, and a comb-like polymer, the comb-like polymer comprising a backbone and a plurality of side chains, the backbone having a length greater than or equal to the entanglement length, the side chains having a length greater than about 33% of the entanglement length, the backbone including at least one side chain per entanglement length, and the comb-like polymer having a $T_g$ of less than −5° C.

The present invention further provides a vulcanizate comprising a cured elastomer, a filler dispersed throughout the elastomer, and a comb-like polymer, the comb-like polymer comprising a backbone and a plurality of side chains, the backbone having a length greater than or equal to the entanglement length, the side chains having a length greater than about 33% of the entanglement length, the backbone incluing at least one side chain per entanglement length, and the comb-like polymer having a $T_g$ of less than −5° C.

The present invention also provides a tire tread compromising a cured elastomer, a filler dispersed throughout the elastomer, and a comb-like polymer, the comb-like polymer comprising a backbone and a plurality of side chains, the backbone having a length greater than or equal to the entanglement length, the side chains having a length greater than about 33% of the entanglement length, the backbone including at least one side chain per entanglement length, and the comb-like polymer having a $T_g$ of less than −5° C.

The present invention still further provides a composition of matter comprising an elastomer, a filler, and a comb polymer, where the comb polymer is formed by reacting (i) a long-chain molecule bearing a Lewis base functionality, and (ii) a polymer bearing pendant functionalities that react with a Lewis base.

The present invention also provides a composition of matter comprising an elastomer, a filler, and a comb polymer, where the comb polymer is formed by copolymerizing macromonomers with monomers, where the macromonomers have a length that is greater than about 33% of the entanglement length.

The compositions of the present invention advantageously exhibit a high degree of damping, as represented by high tan δ, over a wide temperature range without relying on glass transition peaks. As a result, superior damping is achieved across a wide temperature range without a deleterious loss in modulus.

DETAILED DISCUSSION OF ILLUSTRATIVE EMBODIMENTS

The present invention is directed toward rubber compositions and vulcanizates that have improved damping characteristics. These rubber compositions and vulcanizates contain certain polymeric materials that improve damping properties. The polymeric materials, which may also be referred to as a damping component, have a high tan δ over a wide temperature and frequency range. Furthermore, these polymeric materials are viscoelastic and preferably miscible with elastomeric materials.

Preferably, the damping component has a tan δ greater than 0.35 at temperatures from about −40° to about 120° C. In this temperature range, the tan δ of the damping component is more preferably greater than 0.5, and even more preferably greater than 0.8. The damping component is also preferably viscoelastic and therefore has a $T_g$ less than −5° C., more preferably less than −20° C., and even more preferably less than −30° C.

The rubber compositions and vulcanizates of this invention include from about 1 to 500 parts by weight per 100 parts by weight rubber of the damping component (phr). Preferably, the rubber compositions and vulcanizates include from about 5 to about 300 phr, and even more preferably from about 15 to about 100 phr, of the damping component.

The rubber to which the damping component can be added may be referred to as a binder or matrix. The morphology of the rubber compositions and vulcanizates of this invention, however, are not limited to co-continuous phases, i.e. homogeneous blends, or discrete phases within a matrix or binder, i.e. heterogeneous blends. Preferably, the rubber compositions and vulcanizates of this invention are homogeneous to the extent that discrete phases are not visible when using light scattering techniques.

Many elastomeric materials, both natural and synthetic, can be used as the binder. These elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, fluoroelastomers, ethylene/acrylic rubber, ethylene/vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber, polyurethane, and mixtures thereof. As used herein, the term elastomer may refer to a blend of synthetic and natural rubber, a blend of various synthetic elastomers, or simply one type of elastomer. The elastomers may also include functionalized elastomers.

Figure 1B:
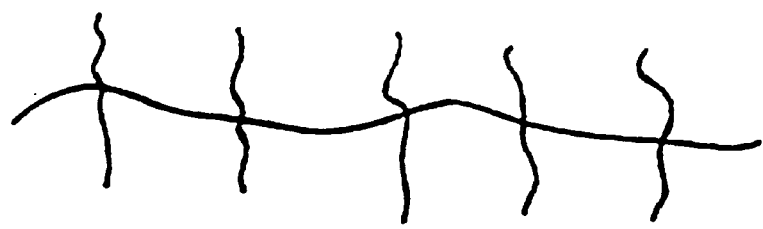
FIGS. 1b and 1c show two representations, on a macromolecular scale, of different embodiments of comb polymers.
Figure 1C:
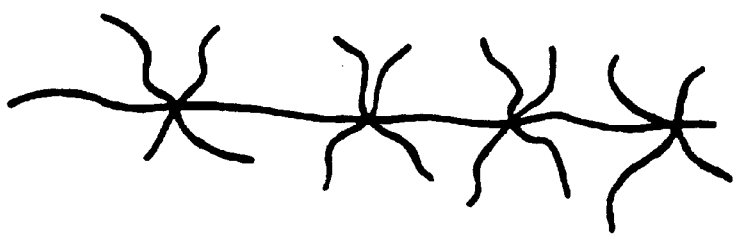

The damping component of the rubber compositions and vulcanizates include comb-like polymers. Comb-like polymers are polymeric structures that include a main polymeric chain or backbone and a multitude of side chains extending from the backbone as shown via typical examples in FIG. 1A and 1B. The side chains may each extend from exclusive or distinct branch points on the polymeric backbone as shown in FIG. 1A, or two or more side chains may extend from the same branch point on the backbone as shown in FIG. 1B. A branch point is that location on the backbone where a side chain is attached. For present purposes, comb-like polymers may simply be referred to as comb polymers.

The length of the backbone of the comb polymer is greater than or equal to the entanglement length. The entanglement length of a polymer chain refers to a number of polymer chain repeating (or mer) units that correspond to a molecular weight sufficiently large for entanglements to occur between molecules of undiluted polymer. This length corresponds to a molecular weight where the slope of a plot of log viscosity vs. log molecular weight changes from 1.0 to 3.4; the change being associated with intermolecular entanglements. In general, the entanglement length has been defined as that length of polymer resulting from about 100 mer units. For purposes of this specification, entanglement length refers to a polymer chain length that includes a number of mer units on the order of magnitude of 100. For example, the entanglement length for polystyrene has been experimentally determined to be about 340 mer units, a number that is on the order of magnitude of 100. Additional experimental techniques for determining the entanglement length of a polymer are summarized by W. W. Graessley in *Adv. Polym. Sci.*, Vol. 16, 1974. In preferred embodiments, the comb polymer backbone is about 3 times larger, and more preferably about 7 times larger, than the entanglement length.

The side chains of the comb polymers generally have a length that is greater than about 33%, more preferably greater than about 50%, and even more preferably greater than entanglement length. Although the side chains should have sufficient length as just described, the length of the side chains preferably is smaller than the length of the backbone. In preferred embodiments, the length of the side chains is preferably less than about 10 times, more preferably less than about 5 times, and even more preferably less than about 3 times the entanglement length. For purposes of this specification, the length of either the side chains or the backbone is described in terms of average length. Average length refers to the number average molecular weight of the side chains before they are grafted, which can be determined experimentally by gel permeation chromatography (GPC).

The comb polymers of this invention preferably have a sufficient number of side chains and branch points to achieve the damping characteristics outlined above. Accordingly, the comb polymers preferably contain at least 2 distinct branch points per entanglement length. As described above, each branch point may contain one or more side chains. Preferably, the comb polymers contain at least 3, more preferably at least 4, even more preferably at least 6, and still more preferably at least 8, branch points per entanglement length.

The number of branch points per entanglement length refers to an average number that can be estimated by dividing the number of monomer units in the backbone by the number of side chains on the backbone, and then dividing the number of monomer units in an entanglement length, which is typically about 100, by this quotient. The number of side chains on the backbone can be approximated by dividing the total weight of all side chains by the weight of an individual side chain. The number average molecular weight of an individual side chain can be determined by using GPC prior to grafting. The total weight of all side chains can be determined by subtracting the weight of the backbone from the weight of the entire comb polymer. The number average molecular weight of the comb polymer can be approximated by using GPC, and the number average weight of the backbone can be approximated by using GPC prior to grafting. Alternatively, the number of branch points per entanglement length can be estimated by determining the amount of side chain that react with a determined amount of backbone, and from these amounts determine the number of side chains that react with a determined amount of backbones. The amount of side chain reacted to a particular backbone can be determined by quantifying the amount of side chain that remains unreacted in an given grafting reaction. Assuming an average, the number of side chains reacted to a backbone can be determined, i.e., the number of grafts can be determined. Once determined, the number of grafts can be divided by the number average molecular weight of the backbone, and then multiplied by the number average molecular weight of the entanglement length of the backbone to thereby provide the number of grafts or side chains per entanglement length. The number of branch points per entanglement length can also be determined by using NMR analysis.

The spacing of the side chains and the $T_g$ of the side chains can be manipulated to control the overall $T_g$ of the comb polymer. As described above, the comb polymers preferably have a $T_g$ less than about −5° C. By selecting side chains with a desired $T_g$, and providing a desired number of side chains along the backbone, one can achieve a desired $T_g$ for the overall comb polymer without concern for the $T_g$ of the backbone. Accordingly, the side chains preferably have a $T_g$ that is less than about −5° C., preferably less than about −20° C., and more preferably less than about −35° C.

Examples of useful comb polymers include, but are not limited to, poly(butylmethacrylate-g-poly(butadiene)), poly(butylmethacrylate-g-poly(styrene-co-butadiene)), poly(butylmethacrylate-g-poly(isoprene)), poly(butylmethacrylate-g-poly(styrene-co-isoprene-co-butadiene)), poly((chloromethylstyene-co-butadiene)-g-poly(butadiene)), poly(chloromethylstyrene-co-butadiene)-g-poly(styrene-co-butadiene)), and mixtures thereof.

Comb polymers can be prepared by reacting: (i) a long-chain molecule bearing a Lewis base functionality with (ii) a polymer bearing pendant functionalities that react with a Lewis base and thereby attach the Lewis base-containing molecule to the polymer bearing the pendant functionality. Those skilled in the art can readily identify, without undue experimentation, pendant functionalities that can react with a Lewis base. These functionalities may be referred to as Lewis base-reactive functionalities. Likewise, those skilled in the art can readily select long-chain molecules that include Lewis base functionalities.

Polymers bearing pendant Lewis base-reactive functionalities can be represented by the general formula (I):

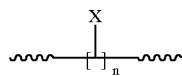

where X represents a group that can react with a Lewis base and n represents an integer that specifies the number of reactive functionalities on the backbone of polymer. X can be attached directly to the polymer backbone or indirectly through, e.g., a divalent organic group. The number of functionalities along the polymer backbone preferably are sufficient to satisfy the general requirements set forth above where the comb polymer contains at least two branch points per entanglement length. When present, the divalent organic group preferably is a $C_1$–$C_{20}$, more preferably a $C_1$–$C_2$, and more preferably a $C_1$–$C_6$ hydrocarbylene group. The hydrocarbylene groups may include, but are not limited to, alkylene, cycloalkylene, substituted alkylene, substituted cycloalkylene, alkenylene, cycloalkenylene, substituted cycloalkenylene, arylene, or substituted arylene groups. The hydrocarbylene groups may include heteroatoms such as, but not limited to, O, S, N, P, and Si.

Specific examples of pendant Lewis base-reactive functionalities include, without limitation halides, epoxides, and carbonyls with pendant leaving groups. Exemplary leaving groups include, but are not limited to, halides, alkoxides, carboxylates, and amines. These leaving groups, when attached to a carbonyl, give rise to acyl halide groups, ester groups, acyclic anhydride groups, cyclic anhydride groups, and carboxamide groups, respectively. Exemplary Lewis base-reactive polymers containing halides include poly(chloromethyl styrene), poly(vinyl chloride), poly(vinyl bromide), poly(chloromethyl styrene-co-butadiene), poly(chloromethyl styrene-co-butadiene-co-isoprene), and poly(chloromethyl styrene-co-isoprene).

The polymeric backbone to which the Lewis base-reactive functionality is pendantly attached can include any polymeric structure capable of bearing the functionality. These polymeric structures, however, preferably have sufficient length to satisfy the general requirements set forth above for the backbone of the comb polymer.

The backbone to which the Lewis base-reactive functionality is pendantly attached can be synthesized from conjugated dienes, monovinyl aromatic monomers, trienes, acrylates, methacrylates, and vinyl chlorides. Advantageously, the polymerization of certain monomers yields a polymeric structure that includes pendantly attached Lewis base-reactive functionalities; e.g., butyl methacrylate.

In preferred embodiments, X is COR', where R' is a halogen atom, carboxylate, alkoxide, or dialkyl amide. Where R' is a carboxylate, and X is linked to the backbone indirectly, the carboxylate can be chosen such that it forms a ring in which a portion of that ring links X to the backbone.

In one preferred embodiment, the polymers bearing pendant Lewis base-reactive functionalities are copolymers deriving in whole or in part from alkyl methacrylate monomers. These copolymers can be represented by the formula (I) where X is $C(O)OR^2$ and where $R^2$ is a monovalent organic group. $R^2$ preferably includes from about 1 to about 30 carbon atoms, more preferably from about 1 to about 20 carbon atoms, and most preferably from about 1 to about 12 carbon atoms. $R^2$ preferably contains a sufficient number of carbon atoms to render the polymer soluble in aliphatic solvents. $R^2$ is preferably a hydrocarbyl group such as, but not limited to, an alkyl, cycloalkyl, substituted cycloalkyl, alkenyl, cycloalkenyl, substituted cycloalkenyl, aryl, allyl, substituted aryl, aralkyl, alkaryl, or an alkynyl group. $R^2$ may include heteroatoms such as, but not limited to, S, N, O, P, and Si.

Some specific examples of polymers or copolymers deriving in whole or in part from alkyl methacrylate monomers include poly(butyl methacrylate), poly(hexyl methacrylate), poly(octyl methacrylate) and poly(dodecyl methacrylate), poly(methyl methacrylate), and Poly(ethyl methacrylate).

In another preferred embodiment, the polymers bearing pendant Lewis base-reactive functionalities include male ated polymers or copolymers. In these polymers and copolymers, X is:

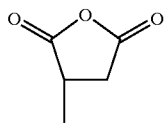

Maleation of polybutadiene or like polymers is known in the art as disclosed in U.S. Pat. No. 5,300,569, which is incorporated herein by reference. Maleated polymers are commercially available from a variety of sources including Ricon Resins, Inc (Grand Junction, Colo.).

Long-chain molecules preferably have, on average, a length that is 33% of the entanglement length. Preferably, the Lewis base functionality is located at the head or tail of the long-chain molecule. Exemplary long-chain molecules that bear a Lewis base functionality include, without limitation, long-chain hydroxyl-functionalized compounds, long-chain amino-functionalized compounds, and anionically-polymerized living polymers.

Hydroxyl-functionalized compounds and amino-functionalized compounds can generally be represented by the following formulas:

where $R^3$ represents a monovalent organic group that preferably contains at least 15 carbon atoms, more preferably at least 20, and even more preferably at least 25 carbon atoms, $R^4$ and $R^5$ are hydrogen or a monovalent organic group, with the proviso that at least one of $R^4$ or $R^5$ is hydrogen. Preferably, $R^3$, $R^4$, and $R^5$ are hydrocarbyl groups such as, but not limited to, alkyl, cycloalkyl, substituted cycloalkyl, amide, alkenyl, cycloalkenyl, substituted cycloalkenyl, aryl, allyl, substituted aryl, aralkyl, alkaryl, and alkynyl groups. These organic groups may include heteroatoms. In preferred embodiments, the organic groups are alkyl groups.

Anionically-polymerized living polymers are formed by reacting monomers by nucleophilic initiation to form and propagate a polymeric structure. Throughout formation and propagation of the polymer, the polymeric structure is ionic or "living." A living polymer, therefore, is a polymeric segment having a living or reactive end. For example, when a lithium (Li) containing initiator is employed to initiate the formation of a polymer, the reaction produces a reactive polymer having a Li atom at its living end. This living end remains after complete polymerization so that a new batch of monomer subsequently added to the reaction can add to the existing chains and increase the degree of polymerization. For further information respecting anionic polymerizations, one can refer to *Principles of Polymerization*, $3^{RD}$ *Edition*, by George Odian, John Wiley & Sons, Inc. (1991), Chapter 5, entitled Ionic Chain Polymerization, or Panek et al., *J. Am. Chem. Soc.*, 94, 8768 (1972).

Monomers that can be employed in preparing a living polymer include any monomer capable of being polymerized according to anionic polymerization techniques. These monomers include those that lead to the formation of elastomeric homopolymers or copolymers. Suitable monomers include, without limitation, conjugated $C_4$–$C_{12}$ dienes, $C_8$–$C_{18}$ monovinyl aromatic monomers, and $C_6$–$C_{20}$ trienes.

Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any nucleophilic initiator can be employed to initiate the formation and propagation of the living polymers. Exemplary initiators include, but are not limited to, alkyl lithium initiators such as n-butyl lithium, arenyllithium initiators, arenylsodium initiators, N-lithium dihydro-carbon amides, aminoalkyllithiums, alkyl tin lithiums, dialkyl magnesiums, alkyl magnesium halides, diaryl magnesiums, and aryl magnesium halides. Other useful initiators include N-lithiohexamethyleneimide, N-lithiopyrrolidinide, and N-lithiododecamethyleneimide as well as organolithium compounds such as substituted aldimines, substituted ketimines, and substituted secondary amines.

Exemplary initiators are also described in the following U.S. Pat. Nos.: 5,332,810, 5,329,005, 5,578,542, 5,393,721, 5,698,646, 5,491,230, 5,521,309, 5,496,940, 5,574,109, and 5,786,441.

Anionic polymerizations are typically conducted in a polar or non-polar solvent such as tetrahydrofuran (THF) or a hydrocarbon such as the various cyclic and acyclic hexanes, heptanes, octanes, pentanes, their alkylated derivatives, and mixtures thereof. To promote randomization in copolymerization and to control vinyl content, a polar coordinator may be added to the polymerization ingredients.

The amount of polar coordinator employed can range between 0 and about 90 or more equivalents per equivalent of Li. The amount depends on the amount of vinyl desired, the level of styrene employed, and the temperature of the polymerization, as well as the nature of the specific polar coordinator (modifier) employed. Suitable polymerization modifiers include, for example, ethers or amines to provide the desired microstructure and randomization. Some preferred living, anionically-polymerized polymers include poly(butadiene), poly(styrene-co-butadiene), poly (isoprene), poly(styrene-co-isoprene), poly(styrene), and poly(styrene-co-butadiene-co-isoprene).

Living, anionically-polymerized polymers preferably have a molecular weight that corresponds to a length that meets the general requirements described above; i.e., the length of the polymer should be from about 33% of the entanglement length to about 10 times the entanglement length or as preferably described above. Also, the living, anionically-polymerized polymers preferably have a $T_g$ that is less than about −5° C., or as preferably described above.

Reaction between (i) the long-chain molecule bearing a Lewis base functionality and (ii) the polymer bearing pendant functionalities that can react with a Lewis base preferably takes place in a diluent such as an organic solvent. A solvent is not required in all instances, especially where one of the reactants is a liquid. Preferred organic solvents include toluene, hexane and cyclohexane.

Those skilled in the art can select reaction conditions that are suitable for carrying out the desired reaction.

In another embodiment, the side chains of the comb polymer are first synthesized, then end-functionalized with a functionality that includes a polymerizable unit or substituent, and then these side chains are copolymerized with other monomers. The end-functionalized side chains may be referred to as macromonomers. The copolymerization of the macromonomers and the additional monomers forms the backbone of the comb polymer, with the macromonomers forming the side chains.

The macromonomers can be synthesized by using any polymerization technique. Alternatively, long-chain molecules can simply be purchased. Those skilled in the art can select the appropriate chemistry to end-functionalize the polymers or long chain molecules to form the macromonomer. Preferably, the polymer or long-chain molecule is functionalized by attaching a vinyl group to the end of the polymer or molecule. The macromonomers should have a length that is sufficient to satisfy the requirements for the length of the side chain, as set forth above.

The macromonomers can be blended with any polymerizable monomer and copolymerized therewith. Those skilled in the art will be able to readily select those monomers that are compatible with and copolymerizable with the macromonomer that is being employed. Exemplary monomers include, but are not limited to, conjugated dienes such as 1,3-butadiene, vinyl aromatic monomers such as styrene, and trienes. The macromonomers should be copolymerized with a sufficient amount of monomer to achieve both the spacing requirements and backbone length requirements set forth above for the overall comb polymer.

In one preferred instance of this embodiment, the comb polymers are formed by first polymerizing a conjugated diene monomer, such as 1,3-butadiene, with an anionic polymerization initiator such as n-butyllithium. This anionic polymerization synthesis leads to the formation of a living polymer that can then be reacted with a vinyl-containing alkyl halide such as chloromethyl styrene. This reaction will end-functionalize the living polymer to form a large molecule containing a polymerizable unit or substituent; i.e., a macromonomer. This macromonomer can then be blended with additional conjugated dienes, such as 1,3-butadiene, or vinyl aromatic monomers, such as styrene, and copolymerized therewith by using anionic polymerization techniques. For example, the macromonomer can be copolymerized with the 1,3-butadiene monomer by using n-butyllithium.

Other components that may be added to the elastomeric binder or matrix include reinforcing fillers, plasticizers, antioxidants, processing aids, and dyes. Exemplary fillers include carbon black, silica, mineral fillers such as clays, including hard clays, soft clays, and chemically modified clays, mica, talc (magnesium silicate), $CaCO_3$, $TiO_2$, $Mg(OH)_2$, ground coal, ground and/or reclaimed rubber, alumina trihydrate, and mixtures thereof.

The damping additive can be blended with a rubber composition by using any method. For example, the damping additive may be pre-blended with the rubber composition, and then the pre-blend or masterbatch can be compounded with optional fillers, vulcanizing agents, and other rubber additives. Alternatively, the damping additive may be added directly to a rubber composition that includes at least one elastomer and other optional rubber additives including fillers and vulcanizing agents. This mixing or blending can be performed in a mill or internal mixer. Alternatively, the damping additive can be blended into the elastomeric binder while in solution. For example, the damping additive and polymeric matrix can be dissolved in a solvent and the solution subsequently blended. The solvent is then evaporated, leaving behind the elastomer-damping additive mixture.

Once the damping additive is added, the elastomeric matrix may be cured or vulcanized by using conventional techniques. Conventional vulcanization typically includes the use of vulcanizing agents in an amount from about 0.5 to about 4 phr. For example, sulfur or peroxide-based curing systems may be employed. The cured elastomeric binder, which according to this invention includes a damping additive and optional other additives, may be referred to as a rubber product, vulcanizate, or simply rubber. Depending on the nature of the damping additive, the damping additive may become incorporated into the crosslinked network of the cured elastomeric matrix.

In one embodiment of this invention, the damping additive is added to a vulcanizable composition that is useful for making tire rubber. Here, the damping additive is added in an amount from about 1 to about 1,000 phr. Even more preferably, the damping additive is added in an amount from about 1 to about 300 phr. The addition of the damping additive improves the overall traction of tire rubber including wet traction, snow traction, and dry traction. Advantageously, the wet traction of tire rubber, which predicted by hysteresis loss at 0° C., and snow traction, which is predicted by hysteresis loss at −20° C., can be improved by at least 10%, even more advantageously by at least 20%, and even more advantageously by about 30%.

Although damping additives are added to vulcanizable compositions that are useful for fabricating tire rubber, practice of this invention does not alter the type or amount of other ingredients, and therefore practice of this invention is not limited to any one vulcanizable composition of matter or tire compounding stock.

Tire formulations include an elastomer or base rubber component that is blended with reinforcing fillers and at least one vulcanizing agent. These compositions typically also include other compounding additives such as accelerators, oils, waxes, scorch inhibiting agents, and processing aids. Compositions containing synthetic rubbers typically include antidegradants, processing oils, zinc oxide, optional tackifying resins, optional reinforcing resins, optional fatty acids, optional peptizers, and optional scorch inhibiting agents.

Both synthetic and natural elastomers are employed within tire formulations. These elastomers include, without limitation, natural rubber, synthetic poly(isoprene), poly(styrene-co-butadiene), poly(butadiene), and poly(styrene-co-butadiene-co-isoprene).

Reinforcing agents, such as carbon black or silica, are typically employed from about 1 to about 100 parts by weight per 100 parts by weight rubber (phr), with about 20 to about 80 phr being preferred, and about 40 to about 80 phr being most preferred.

Carbon blacks may include any commonly available carbon black, but those having a surface area (EMSA) of at least 20 $m^2/g$, and more preferably at least 35 $m^2/g$ up to 200 $m^2/g$ or higher, are preferred. Surface area values used in this application are those determined by ASTM test D-1765 by using the cetyltrimethyl-ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 $m^2/g$, preferably about 100 to about 250 $m^2/g$, and more preferably about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa). Useful commercial grades of different silicas are also available from other sources including Rhone Poulenc.

Typically, a coupling agent is added when silica is used. One coupling agent conventionally used is bis-[3 (triethoxysilyl)propyl]-tetrasulfide, which is commercially available under the tradename S169 (Degussa, Inc.; New York, N.Y.).

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, *Encyclopedia of Chemical Technology*, 3$^{rd}$ Edition, Wiley Interscience, N.Y. 1982, Vol. 20, pp. 365–468, particularly *Vulcanization Agents and Auxiliary Materials* pp. 390–402, or Vulcanization by A. Y. Coran, *Encyclopedia of Polymer Science and Engineering*, 2$^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The damping component is preferably added during preparation of the initial masterbatch. Once this initial masterbatch is prepared, the vulcanizing agents are blended into the composition. The composition can then be manufactured into tire components by using standard construction and curing techniques. Rubber compounding and tire construction is known and disclosed in The Compounding and Vulcanization of Rubber, by Stevens in *Rubber Technology* 2nd Edition (1973). Pneumatic tires can be manufactured according to U.S. Pat. Nos. 5,866,171; 5,876,527; 5,931,211; and 5,971,046, which are incorporated herein by reference.

Tire components of this invention preferably include tire treads. The composition can also be used to form other elastomeric tire components such as subtreads, black sidewalls, body ply skims, bead fillers and the like.

In other embodiments of this invention, damping additives are added to elastomeric compositions of matter that are useful for fabricating vibration restraining materials, which are useful as connecting materials such as sealing materials, packing, gaskets and grommets, supporting materials such as mounts, holders and insulators, and cushion materials such as stoppers, cushions, and bumpers. These materials are also used in equipment producing vibration or noise in household electrical appliances. For example, these materials could be used in air-conditioners, laundry machines, refrigerators, electric fans, vacuums, driers, printers and ventilator fans. Further, these materials are also suitable for impact absorbing or damping materials in audio equipment and electronic or electrical equipment. For example, these materials could be used in compact disc players including portable units and those within vehicles, video cassette recorders, radio cassette recorders, microphones, insulators for disc drives within computers, various holders for optical disc readers, microphones, or speakers including those within portable and cellular telephones. Still further, these materials are useful in sporting goods and shoes.

To demonstrate the practice of the present invention, the following examples have been prepared and tested as described in the Experimental Section disclosed hereinbelow. The examples should not, however, be viewed as limiting the scope of the invention. The claims will serve to define the invention.

GENERAL EXPERIMENTATION

Samples 1–12

Living poly(butadiene), poly(styrene-co-butadiene), and poly(isoprene) were prepared by using the reactants set forth in Table I.

TABLE I

| Ingredient/Samples | 1–6 | 7∝8 | 9–10 | 11–12 |
|---|---|---|---|---|
| Monomer (g) | — | — | — | — |
| butadiene | 370 | 425 | — | 272 |
| isoprene | — | — | 533 | — |
| styrene | — | 142 | — | 68.0 |
| Initiator (mL) | — | — | — | — |
| Sec-butyllithium (1.2M) | 52.3 | — | — | — |
| N-butyllithium (1.5M) | — | 37.8 | 35.5 | 45.4 |
| $M_n$ (GPC) | 5900 | 9630 | 11,250 | 3916 |

Specifically, the living polymers were prepared as follows. To a one gallon reactor equipped with turbine agitator blades was added 0.586 kg toluene and 1.39 kg of 27 wt % butadiene in toluene. After 15 minutes, 52.3 ml of 1.2M sec-butyllithium (Aldrich) was added, and the water jacket temperature was set at 80° F. After approximately 3.5 hours, the jacket temperature was set to 104° F. for another 1.5 hours. A measured amount of live poly(butadiene), 5900 $M_n$, cement was then transferred to a sealed nitrogen purged 32 ounce bottle (Bottle A). This was then cannulated with agitation to a second sealed nitrogen purged 32 ounce bottle containing 10 wt % poly(butylmethacrylate) (Aldrich, 101K $M_n$) in toluene. The bottle was then placed in a 50° C. water bath overnite. The polymer was coagulated with methanol and dried at 50° C. under vacuum.

To a one gallon reactor equipped with turbine agitator blades was added 0.42 lb. hexane, 1.16 lb. 26.9 wt % styrene in hexane, and 3.31 lb. 18.3 wt % butadiene and hexane. After 15 minutes, 6.35 ml 1M 2,2'-di(tetrahydrofuryl) propane in hexane and 75.6 ml of 1.5M n-butyllithium in hexane was added, and the batch temperature was controlled at 122° F. After approximately 4 hours, the batch was cooled and a measured amount of live poly(styrene-co-butadiene), 3699 $M_n$, cement was then transferred to a sealed nitrogen purged 32 ox bottle. This was then cannulated with agitation to a second sealed nitrogen purged 32 oz bottle containing 10 wt % poly(butylmethacrylate) (Aldrich, 101K $M_n$) in toluene. The bottle was then placed in a 50° C. water bath overnight. The polymer was coagulated with methanol and dried at 50° C. under vacuum.

To a one gallon reactor equipped with turbine agitator blades was added 2.218 kg of 24.1 wt % isoprene in hexane. After 7 minutes, 35.53 ml of 1.5M n-butyllithium in hexane was added, and the water jacket temperature was set at 37.8° C. After approximately 140 minutes, a measured amount of live poly(isoprene), 11,250 $M_n$, cement was then transferred to a sealed nitrogen purged 32 oz bottle (Bottle A). This was then cannulated with agitation to a second sealed nitrogen purged 32 oz bottle containing 10 wt % poly (butylmethacrylate) (Aldrich, 101K $M_n$) in toluene. The bottle was then placed in a 50° C. water bath overnite. The polymer was coagulated with methanol and dried at 50° C. under vacuum.

The poly(chloromethylstyrene-co-butadiene) was prepared by emulsion polymerization. Butadiene and chloromethylstyrene were polymerized in the presence of $H_2O$, $C_{12}SO_4Na$, $K_2S_2O_8$, and $CH_3(CH_2)_{11}SH$, whereby $H_2O$ (315 g), $C_{12}SO_4Na$ (26.24 g), and $K_2S_2O_8$ (0.52 g) were purged with nitrogen for about 30 minutes; then, $CH_3(CH_2)_{11}SH$ (0.875 g) was added, followed by the addition of butadiene monomer (131.2 g) and chloromethylstyrene monomer (43.7 g). The mixture was maintained at 50° C. for about 3 days. Tables II, III, IV and V show the reactants used, as well as some characteristics of the resulting comb polymers.

5 is the poly((styrene-co-butadiene)-g-poly(styrene-co-butadiene)) of Sample 11. In their pure state, all examples show a tan δ of greater than 0.5 over a wide range of temperature.

Samples 13–17

The comb polymers of Samples 3, 4, 5, and 6 were compounded to form Samples 13–16, respectively. Sample 17 was a control. The compounding recipe is set forth in Table VI.

The poly(butadiene) employed was a low-cis polymer and comprised about 66.5 weight % polymer molecules having a weight average molecular weight ($M_w$) of about 150,000 to about 250,000, with the balance, i.e., about 33.5 weight %, having an $M_w$ of about 10,000 to about 30,000.

An initial mixture was prepared in a 65 gram Banbury mixer operating at about 60 rpm and an initial temperature of about 80° C. First, the poly(butadiene), stearic acid, and antioxidant were placed in the mixer, and after about 1.5 minutes, the carbon black and the aromatic oil or comb polymer were added. Mixing was continued for about 15 minutes, at which time the temperature was about 110–115° C. This initial mixture was transferred to a mill operating at a temperature of about 60° C., where it was sheeted and subsequently cooled to room temperature. The final compound was mixed within a Banbury mixer operating at about 60 rpm with an initial temperature of about 75° C. The compound was removed from the mixer after about 3 minutes when the material temperature was about 105–110° C. The final compounds were sheeted, formed into shapes, and cured at about 171° C. for about 15 minutes in standard molds placed in a hot press.

Figure 9:
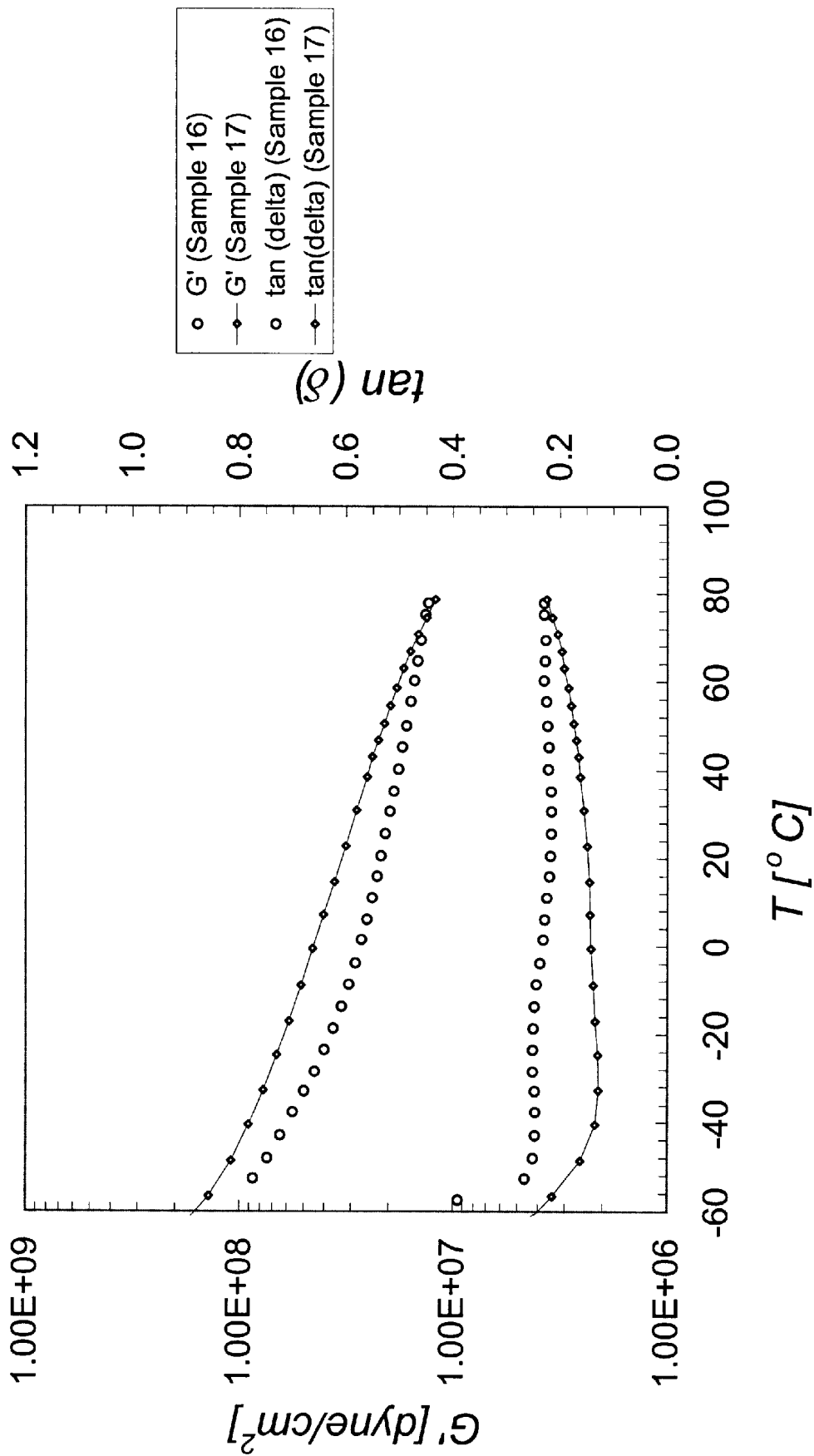

The cured samples were analyzed for tensile properties according to ASTM D412 at 23° C. The results are provided in Table VI. The dynamic moduli sweeps for Samples 13–16 are shown in FIG. 9.

TABLE II

| Sample No. | 1 | 2 | 3 | 4 | 5 | 6 |
|---|---|---|---|---|---|---|
| 18.9% poly(butadiene)/toluene (g) | 300 | 300 | 300 | 300 | 300 | 300 |
| 10% poly(butylmethacrylate)/toluene (g) | 277.1 | 185.4 | 132.4 | 92.7 | 53.0 | 13.3 |
| Monomer units between grafts | 21 | 14 | 10 | 7 | 4 | 1 |
| $T_g$ (° C.) | −93.76 | −93.62 | −93.59 | −93.16 | −93.11 | −93.08 |
| Percentage of polymer grafted (%) | 30.79 | 24.94 | 35.51 | 34.61 | 44.14 | 49.43 |
| $M_n$ | 185,000 | 198,000 | 263,000 | 269,000 | 422,000 | 791,000 |

TABLE III

| Sample No. | 7 | 8 |
|---|---|---|
| 25% poly(styrene-co-butadiene)/hexane (g) | 300 | 300 |
| 10% poly(butylmethacrylate)/toluene (g) | 42.84 | 75 |
| Excess Toluene for Mixing (g) | 257 | 225 |
| Theoretical Monomer units between grafts | 4 | 7 |
| $T_g$ (° C.) | −79.7 | −79.0 |
| Percentage of polymer grafted from GPC | 41.2 | 32.5 |
| $M_n$ | 337,000 | 255,000 |

TABLE IV

| Sample No. | 9 | 10 |
|---|---|---|
| 23.5% poly(isoprene)/hexane (g) | 300 | 300 |
| 10% poly(butylmethacrylate)/toluene (g) | 70.5 | 40.3 |
| Theoretical Monomer units between grafts | 7 | 4 |
| $T_g$ (° C.) | −62 | −61.3 |
| Percentage of polymer grafted from GPC | 54.2 | 56.4 |
| $M_n$ | 575,000 | 660,000 |

TABLE V

| Sample No. | 11 | 12 |
|---|---|---|
| 15% poly(styrene-co-butadiene)/hexane (g) | 261 | 261 |
| 10% poly(chloromethylstyrene-co-butadiene)/toluene (g) | 100 | 200 |
| Theoretical Monomer units between grafts | 13.6 | 6.8 |
| $T_g$ (° C.) | −39.6 | −45.6 |
| Percentage of polymer grafted from GPC | 37.8 | 46.5 |
| Mn | 45,000 | 47,000 |

Figure 2:
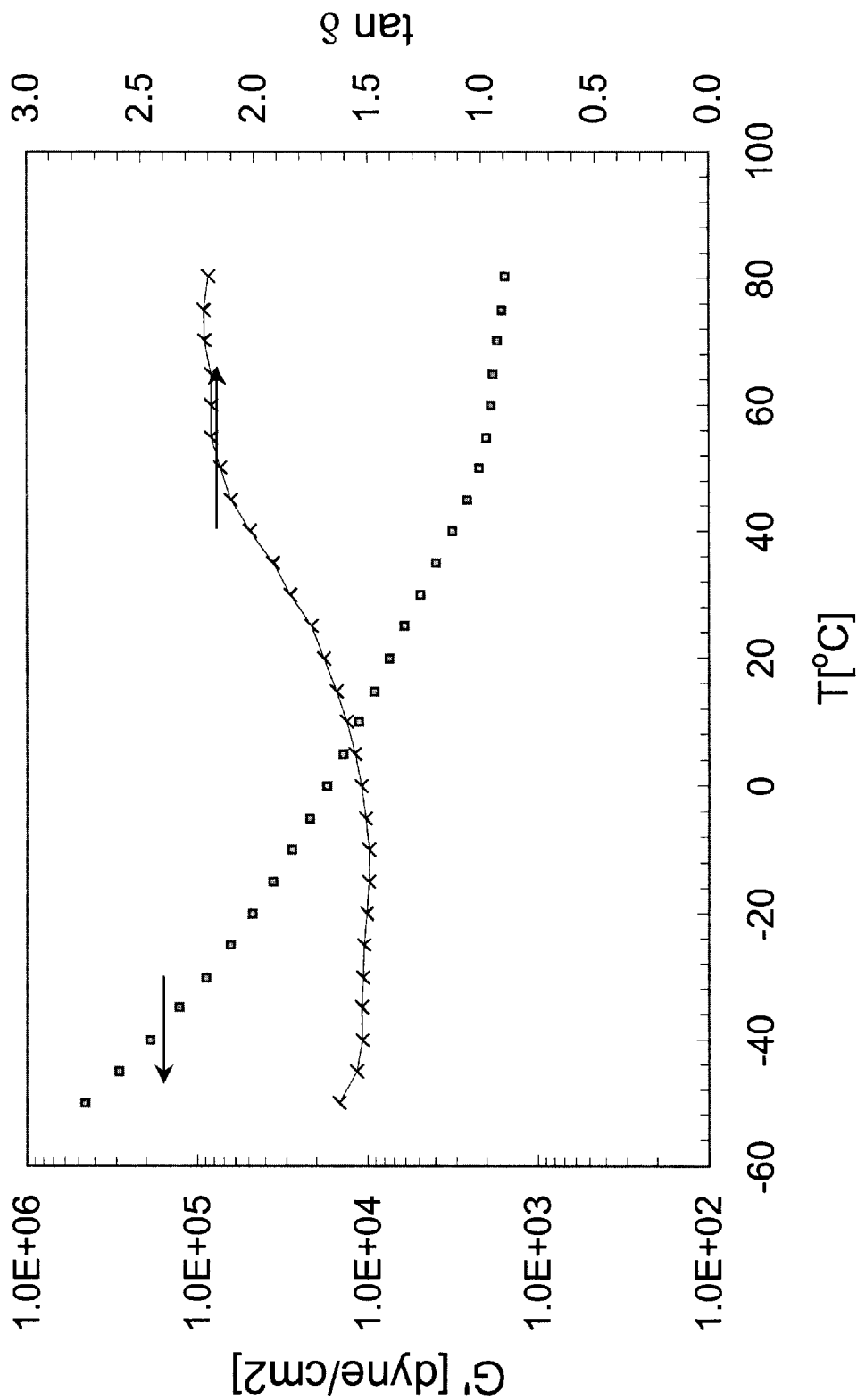
FIG. 2 is a graphical plot of the dynamic moduli sweep of four different poly(butylmethacrylate-g-poly(butadiene)) comb polymer.
Figure 3:
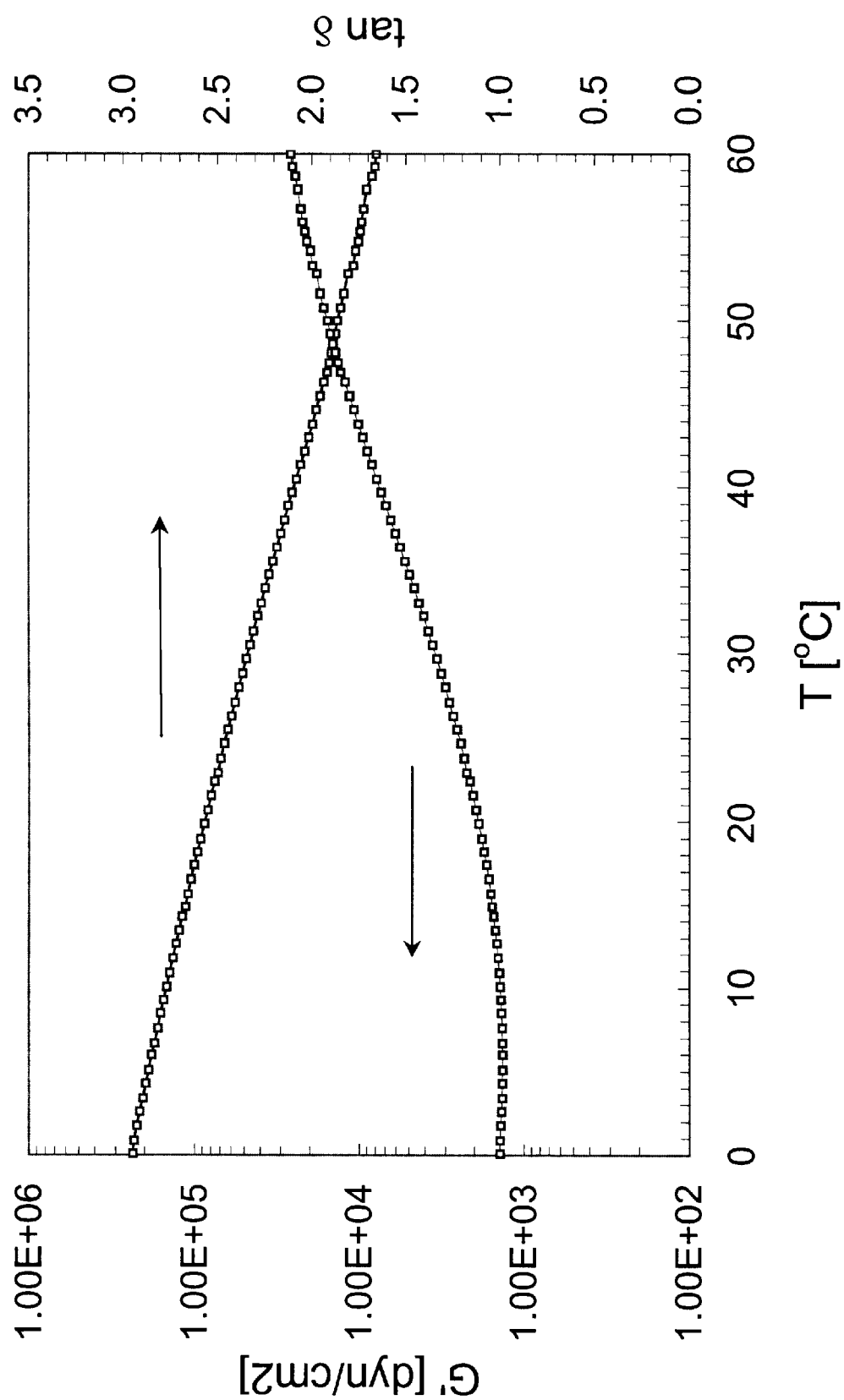
FIG. 3 is a graphical plot of the dynamic moduli sweep of a poly(butylmethacrylate-g-poly(styrene-co-butadiene)) comb polymer.
Figure 4:
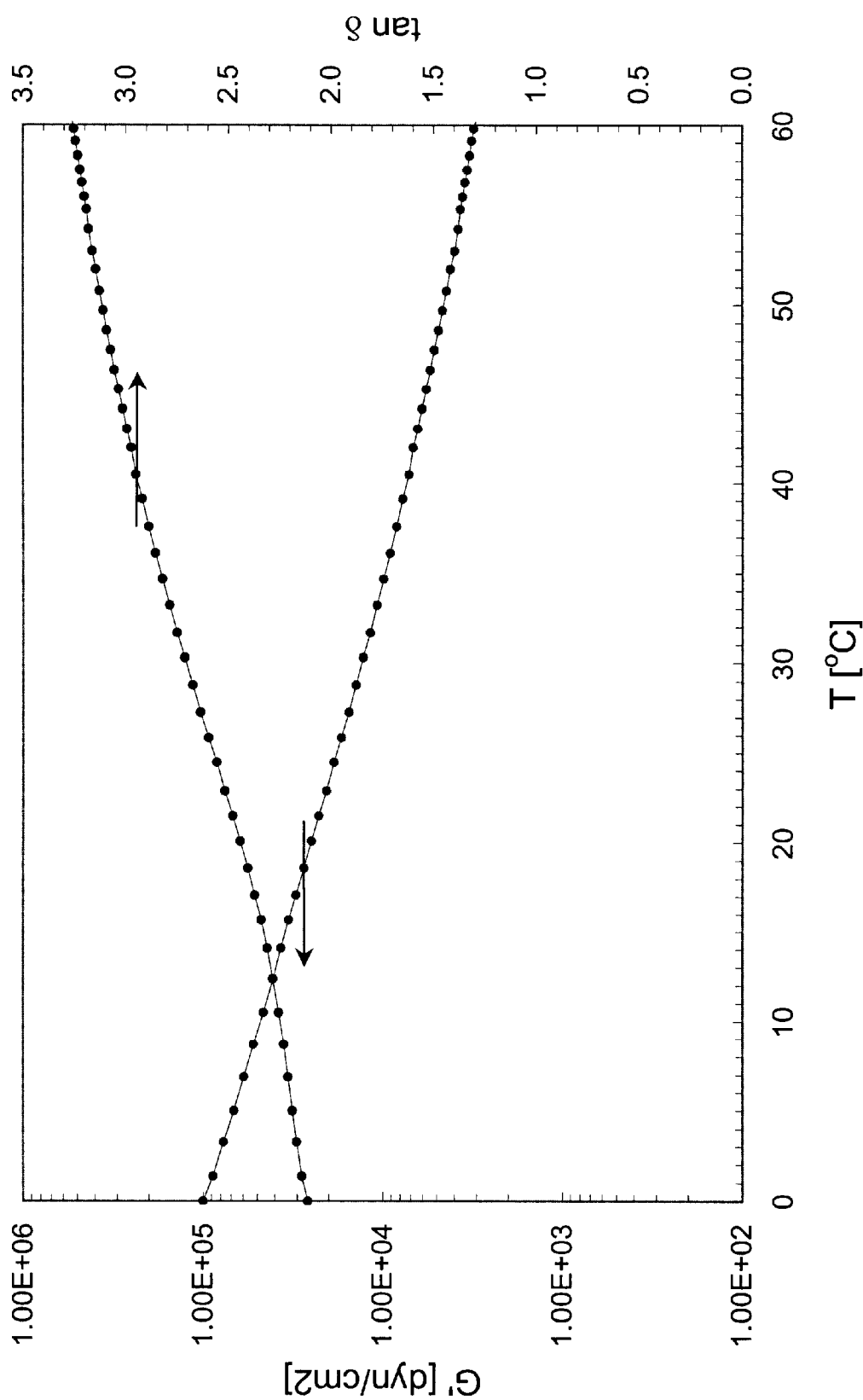
FIG. 4 is a graphical plot of the dynamic moduli sweep of a poly(butylmethacrylate-g-poly(isoprene))comb polymer.
Figure 5:
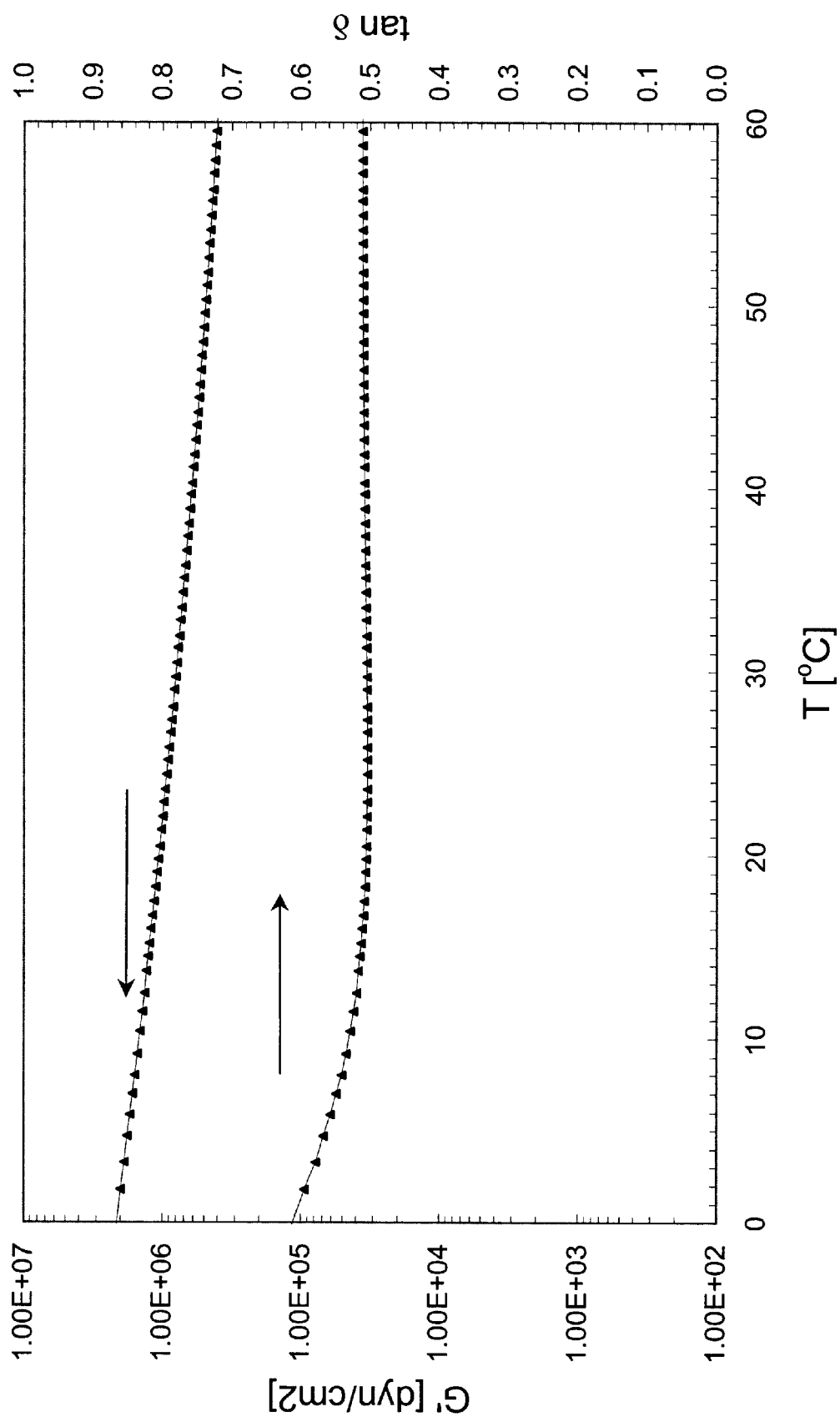
FIG. 5 is a graphical plot of the dynamic moduli sweep of a poly((styrene-co-butadiene)-g-poly(styrene-co-butadiene))comb polymer.
Figure 6:
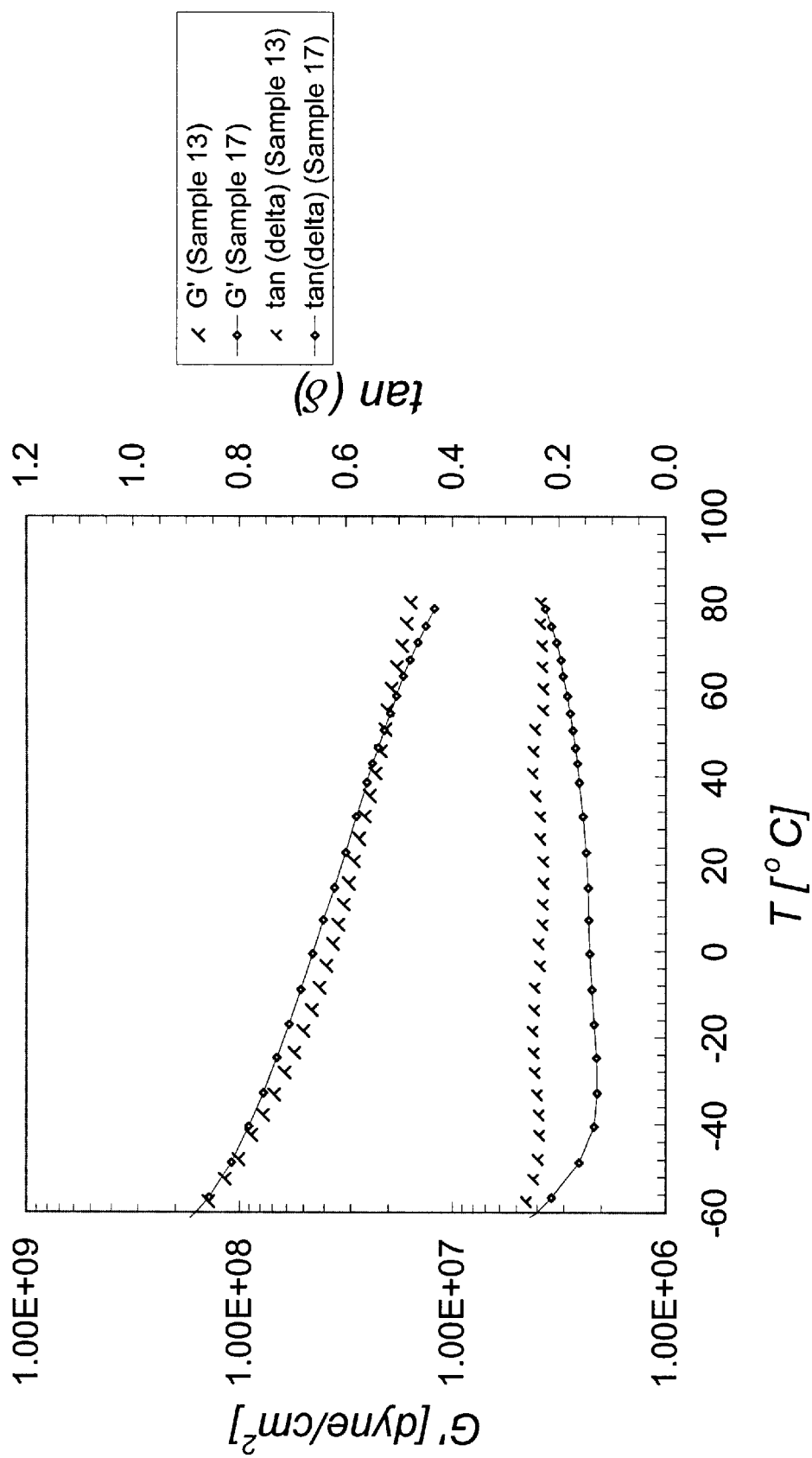
FIGS. 6–9 are graphical plots of the dynamic moduli sweep of four vulcanizates that were compounded with poly(butylmethacrylate-g-poly(butadiene)).
Figure 7:
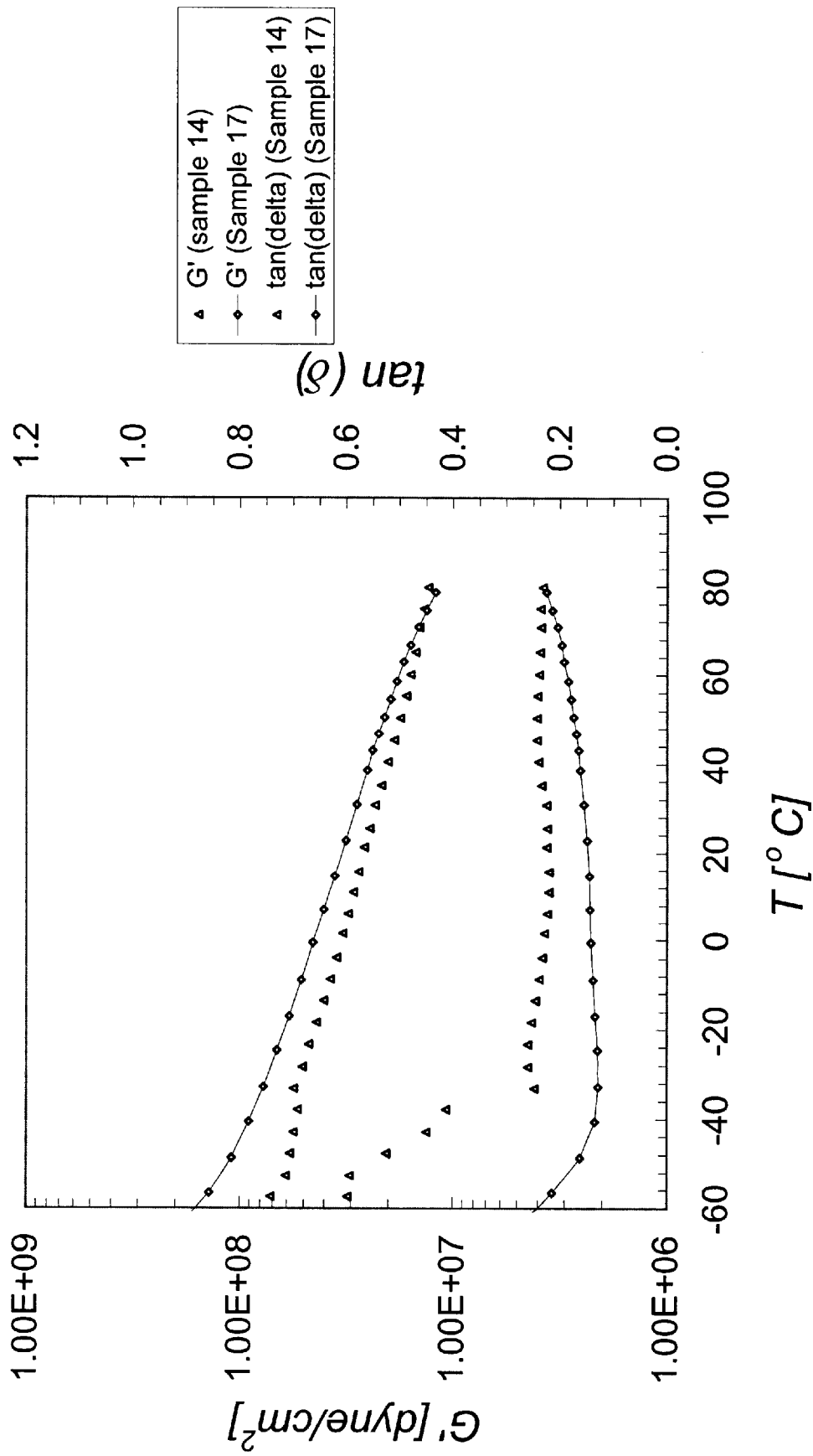
Figure 8:
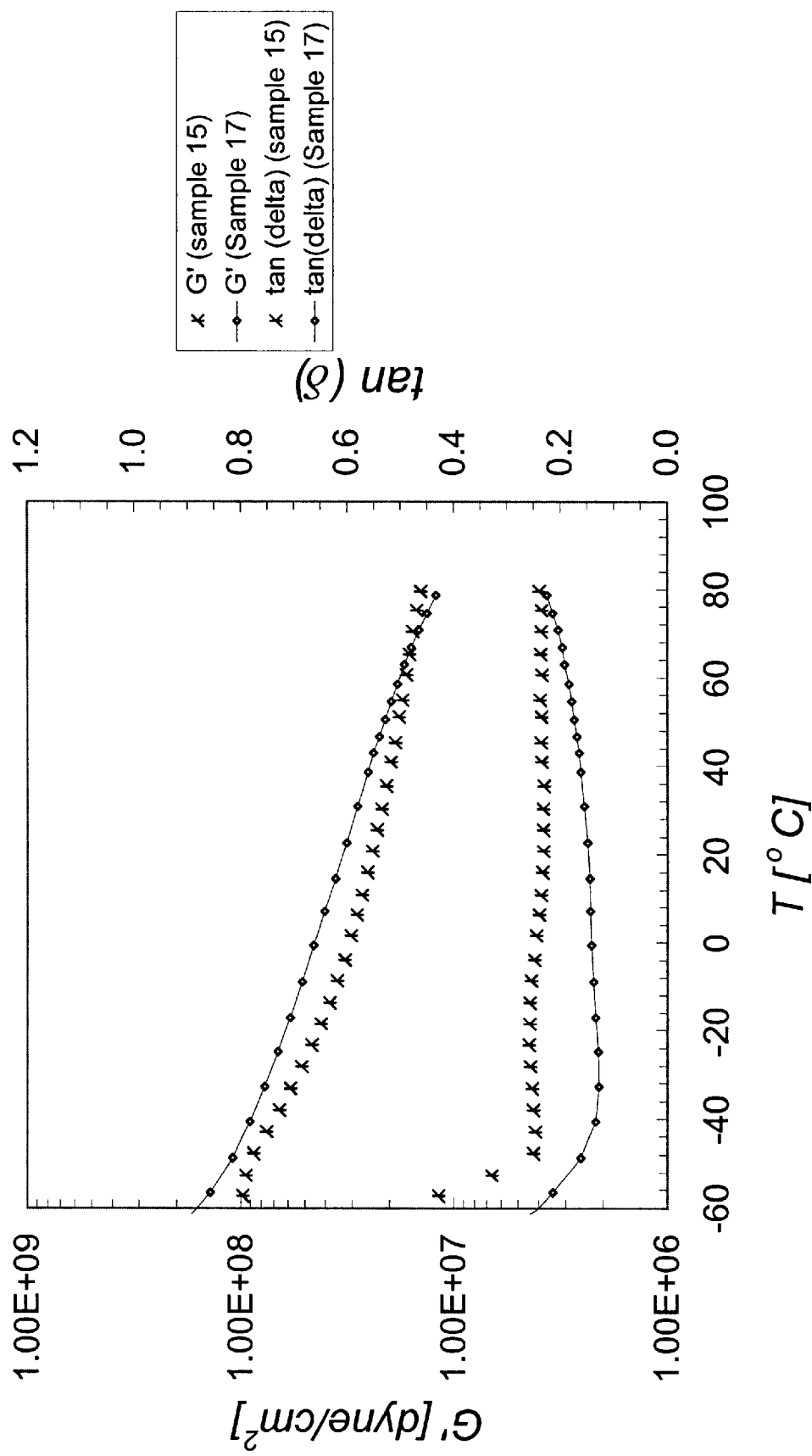

The dynamic storage moduli (G' and tan δ) of each sample was measured by temperature sweep experiments. The temperature sweep measurements were performed typically at a frequency of 31.4 rad/sec and strain of 0.5% in the temperature range of −100 to 100° C. FIG. 2 is a sweep for the poly(butylmethacrylate-g-poly(butadiene)) of Sample 4, FIG. 3 is the poly(butylmethacrylate-g-poly(styrene-co-butadiene)) of Sample 8, FIG. 4 is the poly(butylmethacrylate-g-poly(isoprene)) of Sample 9, and FIG.

TABLE VI

| Sample No. | 13 | 14 | 15 | 16 | 17 |
|---|---|---|---|---|---|
| Initial Mixture (g) | | | | | |
| Poly(butadiene) | 100 | 100 | 100 | 100 | 100 |
| Carbon Black | 80 | 80 | 80 | 80 | 80 |
| Aromatic Oil | 60 | 60 | 60 | 60 | 100 |
| Comb Polymer | 40 | 40 | 40 | 40 | — |
| Stearic Acid | 3 | 3 | 3 | 3 | 3 |
| Antioxidant | 1 | 1 | 1 | 1 | 1 |
| Final Compound (g) | | | | | |
| Sulfur | 1.15 | 1.15 | 1.15 | 1.15 | 1.15 |
| N-tert-butyl-benzothiazole-sulfenamide | 1 | 1 | 1 | 1 | 1 |
| Zinc Oxide | 3 | 3 | 3 | 3 | 3 |
| Benzothiazyl disulfide | 1 | 1 | 1 | 1 | 1 |

TABLE VI-continued

| Sample No. | 13 | 14 | 15 | 16 | 17 |
|---|---|---|---|---|---|
| Diphenylguanimide | 0.5 | 0.5 | 0.5 | 0.5 | 0.5 |
| Properties | | | | | |
| tan δ at 0° C. | 0.16 | 0.16 | 0.176 | 0.176 | 0.143 |
| tan δ at 20° C. | 0.173 | 0.154 | 0.18 | 0.182 | 0.147 |
| tan δ at 50° C. | 0.213 | 0.176 | 0.19 | 0.202 | 0.174 |

Samples 18–20

Figure 10:
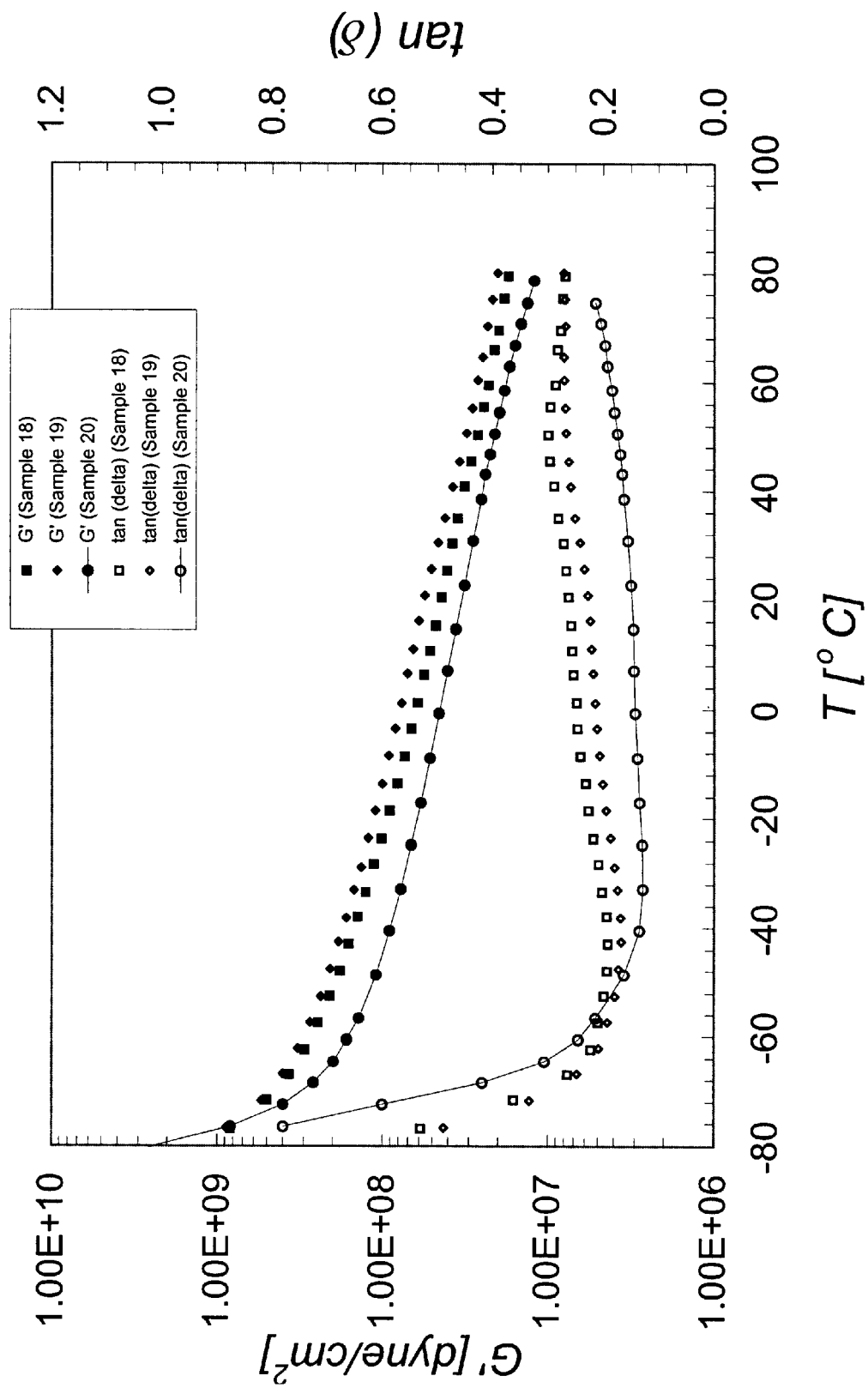
FIG. 10 is a graphical plot of the dynamic moduli sweep of two vulcanizates that were compounded with poly (butylmethacrylate-g-poly(styrene-co-butadiene)).

In a similar fashion to tire recipes of Samples 13–17, Samples 7 and 8 were compounded into tire recipes to form Samples 18 and 19, respectively. Sample 20 was a control. The compounding recipe is provided in Table VII. The tensile properties of these Samples are also shown in Table VII, and the dynamic moduli sweeps are shown in FIG. 10.

TABLE VII

| Sample No. | 18 | 19 | 20 |
|---|---|---|---|
| Initial Mixture (g) | | | |
| Poly(butadiene) | 100 | 100 | 100 |
| Carbon Black | 80 | 80 | 80 |
| Aromatic Oil | 90 | 90 | 100 |
| Comb Polymer | 10 | 10 | — |
| Stearic Acid | 3 | 3 | 3 |
| Antioxidant | 1 | 1 | 1 |
| Final Compound (g) | | | |
| Sulfur | 1.15 | 1.15 | 1.15 |
| N-tert-butyl-benzothiazolesulfenamide | 1 | 1 | 1 |
| Zinc Oxide | 3 | 3 | 3 |
| Benzothiazyl disulfide | 1 | 1 | 1 |
| Diphenylguanimide | 0.5 | 0.5 | 0.5 |
| Physical Properties | | | |
| 100% Modulus at 23° C. (kPa) | 0.843 | 0.795 | 0.850 |
| 300% Modulus at 23° C. (kPa) | 1.63 | 1.60 | 1.53 |
| Maximum Stress (%) | 697 | 584 | 620 |
| Maximum Strain (%) | 813 | 730 | 850 |
| tan δ at 0° C. | 0.249 | 0.212 | 0.141 |
| tan δ at 20° C. | 0.265 | 0.228 | 0.146 |
| tan δ at 50° C. | 0.3 | 0.268 | 0.174 |

Sample 21

Comb polymers were prepared by reacting maleated polybutadiene (170 grams), which was obtained under the name 131MA20™ (Ricon Resins), with 1-docosanol ($C_{22}$) (116 grams). Specifically, the ingredients were contacted within an internal mixer operating at 40 rpm at 80 °C. After five minutes, the temperature was increased to 150° C. and mixing continued for 30 minutes. Then, the temperature was increased to 180° C. and mixing continued for another 40 minutes. The mixer was cooled at a rate of 4° C./min, and the product was removed at about 100° C.

Samples 22–24

Vulcanized elastomeric compositions were prepared with the comb polymers from Sample 21 by using a similar procedure to that described in the preceding samples. The formulations of Samples 22–24 are shown in Table VIII, where Sample 22 is a control.

The styrene-butadiene rubber used in Samples 22–24 was an oil extended high-styrene SBR containing 33% bound styrene with a $T_g$ of −47° C., which is commercially available under the tradename Duradene 753 (Firestone Synthetic Polymers; Akron, Ohio). The butadiene rubber was a high cis-polybutadiene with a cis-configuration content of about 96%, which is commercially available under the tradename Diene 600 (Firestone). Table VIII also provides the results of tensile testing.

TABLE VIII

| Ingredient (parts by weight) | 22 | 23 | 24 |
|---|---|---|---|
| Initial Mixture (g) | | | |
| Styrene-Butadiene Rubber (SBR) | 96.8 | 96.8 | 96.8 |
| Poly(butadiene) | 20 | 20 | 20 |
| Carbon Black | 70 | 70 | 70 |
| Aromatic Oil | 35.05 | 30.05 | 27.05 |
| Comb Polymer | 0 | 5 | 8 |
| Stearic Acid | 2 | 2 | 2 |
| Wax | 1.5 | 1.5 | 1.5 |
| N-1,3-dimethylbutyl-N'-phenyl-p-phenylenediamine | 0.95 | 0.95 | 0.95 |
| Final Compound (g) | | | |
| Sulfur | 1.7 | 1.7 | 1.7 |
| N-tert-butyl-benzothiazolesulfeneamine | 0.8 | 0.8 | 0.8 |
| Zinc Oxide | 2 | 2 | 2 |
| polymerized 1,2-dihydro-2,2,4-trimethylquinoline | 0.22 | 0.22 | 0.22 |
| benzothiazyl disulfide | 0.2 | 0.2 | 0.2 |
| tetramethylthiuram monosulfide | 0.2 | 0.2 | 0.2 |
| Physical Properties | | | |
| Modulus at (kPa) | 8.622 | 9.390 | 8.160 |
| Tensile strength at (kPa) | 18.92 | 22.13 | 20.48 |
| Maximum elongation (%) | 535 | 576 | 598 |
| Tear strength at 170° C. (kPa) | 1.74 | 1.89 | 1.78 |
| Travel at tear at 170° C. (kPa) | 2.82 | 3.00 | 3.19 |
| Tan δ at 23° C. | 0.1828 | 0.1801 | 0.1867 |
| Tan δ at 50° C. | 0.1605 | 0.1674 | 0.1815 |

Sample 25

A comb polymer was prepared by polymerizing a polybutadienyl styrene macromonomer with 1,3-butadiene monomer (102 grams of 27.5%) by using an n-butyllithium catalyst (1.12 mmole) in the presence of 1,2'-di(oxolanyl) propane (0.8 mmole) within hexane for 2 hours at 65° C. The polybutadienyl styrene macromonomer was prepared by polymerizing 1,3-butadiene (205 grams of 27.5%) with an n-butyllithium catalyst (19.2 mmole) for 90 minutes at 50° C., and then this living polymer was reacted with chloromethyl styrene (19.2 mmole). An 89% yield was obtained from the copolymerization as determined by GPC with a polystyrene standard. The resulting comb polymer was determined to have an Mn of 32,900, and an Mw of 102,500, and an Mz of 207,700, again by GPC. The comb polymer was then coupled with $SiCl_4$ (0.3 mmole) to yield a macromolecule having an Mn of 41,000, an Mw of 283,200, and an Mz of 687,700. FIG. 11 shows the sweep for this coupled comb polymer, showing a tan δ of greater than 0.6 over a wide temperature range in its pure state.

Various modifications and alterations that do not depart from the scope and spirit of this invention will become apparent to those skilled in the art. This invention is not to be duly limited to the illustrative embodiments set forth herein.

What is claimed is:
1. A composition comprising:
   an elastomer;
   a filler; and
   a comb polymer, said comb polymer comprising a backbone and a plurality of side chains, said backbone having a length greater than or equal to the entanglement length, said side chains having a length greater than about 33% of the entanglement length, said side chains having a Tg of less than about −5° C., said backbone including at least one side chain per entanglement length, and said comb polymer having a Tg of less than −5° C., where the comb polymer is selected from the group consisting of poly(butylmethacrylate-g-poly (butadiene)), poly(butylmethacrylate-g-poly(styrene-co-butadiene)), poly(butylmethacrylate-g-poly (isoprene)), poly(butylmethacrylate-g-poly(styrene-co-isoprene-co-butadiene)), poly((chloromethylstyrene-co-butadiene)-g-poly(butadiene)), poly ((chloromethylstyrene-co-butadiene)-g-poly(styrene-co-butadiene)), and poly((chloromethylstyrene-co-butadiene)-g-poly(styrene-co-isoprene-butadiene)).

2. The composition of claim 1, where said backbone has a length at least 5 times greater than the entanglement length.

3. The composition of claim 1, where said backbone has a length at least 7 times greater than the entanglement length.

4. The composition of claim 1, where said side chains have a length greater than about ½ the entanglement length.

5. The composition of claim 4, where said side chains have a length greater than the entanglement length.

6. The composition of claim 1, where said comb polymer has a glass transition temperature less than about −10° C.

7. The composition of claim 6, where said comb polymer has a glass transition temperature less than about −20° C.

8. The composition of claim 1, where said side chains have a length less than the length of the backbone.

9. The composition of claim 1, where said side chains have a length less than 10 times the entanglement length.

10. The composition of claim 1, where said side chains have a length less than 5 times the entanglement length.

11. The composition of claim 1, where said comb polymer is poly((chloromethylstyrene-co-butadiene)-g-poly(butadiene)).

12. The composition of claim 1, where said comb polymer is poly((chloromethylstyrene-co-butadiene)-g-poly(butadiene)).

13. The composition of claim 1, where said comb polymer is poly((chloromethylstyrene-co-butadiene)-g-poly(butadiene)).

14. The composition of claim 1, where said comb polymer contains at least 3 distinct branch points per entanglement length.

15. The composition of claim 1, where said comb polymer contains at least 4 distinct branch points per entanglement length.

16. The composition of claim 1, where said comb polymer contains at least 5 distinct branch points per entanglement length.

17. A composition comprising:
an elastomer;
a filler; and
a comb polymer, said comb polymer comprising a backbone and a plurality of side chains, said backbone having a length greater than or equal to the entanglement length, said side chains having a length greater than about 33% of the entanglement length, said side chains having a Tg of less than about −5° C., said backbone including at least one side chain per entanglement length, and said comb polymer having a $T_g$ of less than −5° C., where said comb polymer contains at least 2 distinct branch points per entanglement length.

18. The composition of claim 17, where said comb polymer contains at lest 3 distinct branch points per entanglement length.

19. The composition of claim 17, where said comb polymer contains at least 4 distinct branch points per entanglement length.

20. The composition of claim 17, where said comb polymer contains at least 5 distinct branch points per entanglement length.

21. A vulcanizate comprising:
a cured elastomer;
a filler dispersed throughout said elastomer; and
a comb polymer, said comb polymer comprising a backbone and a plurality of side chains, said backbone having a length greater than or equal to the entanglement length, said side chains having a length greater than about 33% of the entanglement length, said side chains having a Tg of less than about −5° C., said backbone including at least one side chain per entanglement length, and said comb polymer having a $T_g$ of less than −5° C., where the comb polymer is selected from the group consisting of poly(butylmethacrylate-g-poly(butadiene)), poly (butylmethacrylate-g-poly(styrene-co-butadiene)), poly(butylmethacrylate-g-poly(isoprene)), poly (butylmethacrylate-g-poly(styrene-co-isoprene-co-butadiene)), poly((chloromethylstyrene-co-butadiene)-g-poly(butadiene)), poly ((chloromethylstyrene-co-butadiene)-g-poly (styrene-co-butadiene)), and poly ((chloromethylstyrene-co-butadiene)-g-poly (styrene-co-isoprene-butadiene)).

22. The vulcanizate of claim 21, wherein the vulcanizate is a tire tread.

23. A vulcanizate comprising:
a cured elastomer;
a filler dispersed throughout said elastomer; and
a comb polymer, said comb polymer comprising a backbone and a plurality of side chains, said backbone having a length greater than or equal to the entanglement length, said side chains having a length greater than about 33% of the entanglement length, said side chains having a Tg of less than about −5° C., said backbone including at least one side chain per entanglement length, and said comb polymer having a Tg of less than −5° C., where said comb polymer contains at least 2 distinct branch points per entanglement length.

24. The vulcanizate of claim 23, where said comb polymer contains at least 3 distinct branch points per entanglement length.

25. The vulcanizate of claim 23, where said comb polymer contains at least 4 distinct branch points per entanglement length.

26. The vulcanizate of claim 23, where said comb polymer contains at least 5 distinct branch points per entanglement length.

27. The vulcanizate of claim 23, wherein the vulcanizate is a tire tread.

28. A tire tread compromising;
a cured elastomer;
a filler dispersed throughout said elastomer; and
a comb-like polymer, said comb polymer comprising a backbone and a plurality of side chains, said backbone having a length greater than or equal to the entanglement length, said side chains having a length greater than about 33% of the entanglement length, said side chains having a Tg of less than about −5° C., said backbone including at least one side chain per entanglement length, and said comb polymer having a $T_g$ of less than −5° C., where the comb polymer is selected from the group consisting of poly(butylmethacrylate-g-poly (butadiene)), poly(butylmethacrylate-g-poly(styrene-co-butadiene)), poly(butylmethacrylate-g-poly (isoprene)), poly(butylmethacrylate-g-poly(styrene-co-isoprene-co-butadiene)), poly((chloromethylstyrene-co-butadiene)-g-poly(butadiene)), poly ((chloromethylstyrene-co-butadiene)-g-poly(styrene-co-butadiene)), and poly((chloromethylstyrene-co-butadiene)-g-poly(styrene-co-isoprene-butadiene)).

* * * * *

UNITED STATES PATENT AND TRADEMARK OFFICE
CERTIFICATE OF CORRECTION

PATENT NO. : 6,630,535 B1
DATED : October 7, 2003
INVENTOR(S) : Hogan, Terrence E. et al.

It is certified that error appears in the above-identified patent and that said Letters Patent is hereby corrected as shown below:

<u>Column 17,</u>
Lines 38-39, delete "poly((chloromethylstyrene-co-butadiene)-g-poly" should read -- poly(butylmethacrylate-g-poly (butadiene)) --
Lines 41-42, delete "poly((chloromethylstyrene-co-butadiene)-g-poly (butadiene))" should read -- poly(butylmethacrylate-g-poly(styrene-co-butadiene) --

Signed and Sealed this

Twenty-seventh Day of July, 2004

JON W. DUDAS
*Acting Director of the United States Patent and Trademark Office*